(12) United States Patent
Crampton

(10) Patent No.: US 8,104,753 B2
(45) Date of Patent: Jan. 31, 2012

(54) SUPPORT MEANS

(75) Inventor: David Crampton, Oakworth (GB)

(73) Assignee: David Crampton, Oakworth, Keighley (GB)

( * ) Notice: Subject to any disclaimer, the term of this patent is extended or adjusted under 35 U.S.C. 154(b) by 963 days.

(21) Appl. No.: 11/816,385

(22) PCT Filed: Jun. 22, 2006

(86) PCT No.: PCT/GB2006/002269
§ 371 (c)(1),
(2), (4) Date: Oct. 17, 2007

(87) PCT Pub. No.: WO2007/096570
PCT Pub. Date: Aug. 30, 2007

(65) Prior Publication Data
US 2009/0033014 A1  Feb. 5, 2009

(30) Foreign Application Priority Data
Feb. 27, 2006  (GB) .................................. 0603862.4

(51) Int. Cl.
B23Q 3/02 (2006.01)
(52) U.S. Cl. ................... 269/133; 269/3; 269/6; 269/43; 269/95
(58) Field of Classification Search .................. 269/238, 269/321 F, 17, 33, 905, 133; 248/469, 472, 248/526, 466, 188.2, 188.7, 188.8, 677, 316.4, 248/229.12, 229.22; 5/634, 505.1
See application file for complete search history.

(56) References Cited

U.S. PATENT DOCUMENTS

| 331,164 | A | * | 11/1885 | Shaw | 269/259 |
| 338,458 | A | * | 3/1886 | Abernethy | 269/203 |
| 342,187 | A | * | 5/1886 | Cornell | 269/133 |
| 611,340 | A | * | 9/1898 | Smith | 269/133 |
| 848,837 | A | | 4/1907 | Marz et al. | 269/133 |
| 1,429,788 | A | * | 9/1922 | Soliah | 269/133 |
| 1,446,309 | A | * | 2/1923 | Krohne | 269/133 |
| 1,715,722 | A | * | 6/1929 | Smith et al. | 269/133 |
| 2,621,687 | A | * | 12/1952 | Fordon | 269/133 |
| 2,710,241 | A | * | 6/1955 | Lieberman | 312/265.3 |
| 2,763,302 | A | * | 9/1956 | English | 269/133 |
| 2,971,548 | A | * | 2/1961 | House | 269/133 |
| 3,144,234 | A | * | 8/1964 | Artmann | 248/188.2 |

(Continued)

FOREIGN PATENT DOCUMENTS

GB  2255587  11/1992

(Continued)

OTHER PUBLICATIONS

International Search Report and Written Opinion, issued in International Application No. PCT/GB2006/002269, mailed on Nov. 10, 2006.

(Continued)

Primary Examiner — George Nguyen
(74) Attorney, Agent, or Firm — Fulbright & Jaworski

(57) ABSTRACT

Support means are provided for supporting one or more items in use. The support means includes at least first and second members and at least one of said first and second member movable relative to the other member to allow clamping and/or unclamping on an item located between said members. The first and second members being hingedly or pivotably movable between said clamped and/or unclamped positions.

15 Claims, 4 Drawing Sheets

U.S. PATENT DOCUMENTS

| | | | | |
|---|---|---|---|---|
| 3,775,783 A * | 12/1973 | Miller | | 5/201 |
| 3,824,638 A * | 7/1974 | Bogar, Jr. | | 5/181 |
| 3,861,662 A | 1/1975 | Morse | | 269/17 |
| 3,983,387 A * | 9/1976 | Van Steenhoven et al. | | 362/375 |
| 4,141,192 A * | 2/1979 | Augustine | | 52/749.1 |
| 4,168,827 A * | 9/1979 | Hutchinson | | 269/238 |
| 4,224,704 A * | 9/1980 | Nowell | | 5/181 |
| 4,270,741 A * | 6/1981 | Hurst | | 269/17 |
| 4,295,234 A * | 10/1981 | Whitehead | | 5/184 |
| 4,554,692 A * | 11/1985 | Whitehead | | 5/411 |
| 4,637,177 A * | 1/1987 | Long | | 52/36.1 |
| 4,978,132 A * | 12/1990 | Wilson et al. | | 280/47.131 |
| 5,203,042 A * | 4/1993 | Mason | | 5/504.1 |
| 5,294,099 A * | 3/1994 | Dalfino | | 269/133 |
| 5,344,116 A * | 9/1994 | Winkler | | 248/677 |
| 5,690,304 A * | 11/1997 | Folkens | | 248/188.4 |
| 5,697,586 A * | 12/1997 | Lybarger | | 248/188.4 |
| 6,056,282 A * | 5/2000 | Desmarais | | 269/37 |
| 6,231,034 B1 * | 5/2001 | Walker et al. | | 269/17 |
| 6,264,184 B1 * | 7/2001 | Armstrong et al. | | 269/17 |
| 6,505,844 B2 * | 1/2003 | Hallman et al. | | 280/79.7 |
| 6,601,838 B1 * | 8/2003 | Gilley | | 269/37 |
| 6,663,123 B1 * | 12/2003 | Kovacs | | 280/79.7 |
| 6,886,821 B2 * | 5/2005 | Eberle, III | | 269/133 |
| 7,246,779 B2 * | 7/2007 | Doyle | | 248/188.8 |
| 7,901,338 B2 * | 3/2011 | Gerschefske | | 482/142 |
| 2003/0002957 A1 * | 1/2003 | Etheredge | | 414/11 |

FOREIGN PATENT DOCUMENTS

| | | |
|---|---|---|
| GB | 2278811 | 11/1994 |
| GB | 2435232 | 8/2007 |
| WO | WO 03/095149 | 11/2003 |
| WO | WO 2007/096622 | 8/2007 |

OTHER PUBLICATIONS

Office Communication, issued in European Patent Application No. 06 764 866.7, mailed Feb. 24, 2010.

Office Communication, issued in European Patent Application No. 06 764 866.7, mailed Aug. 6, 2009.

Response to Office Communication mailed Feb. 24, 2010 issued in European Patent Application No. 06 764 866.7, Apr. 26, 2010.

Response to Office Communication mailed Aug. 6, 2009, issued in European Patent Application No. 06 764 866.7, mailed Nov. 23, 2009.

* cited by examiner

SUPPORT MEANS

The present application is a national phase application under 35 U.S.C. §371 of International Application No. PCT/GB2006/002269, filed 22 Jun. 2006, which claims the benefit of Great Britain Application No. 0603862, filed 27 Feb. 2006. The entire text of these applications are incorporated by reference.

This invention relates to support means for supporting one or more items in use.

Although the following description refers almost exclusively to support means for supporting an item in the form of a door, it will be appreciated by persons skilled in the art that the present invention can be used to support any item, can be used as a display stand, to support fence posts, to form part of a work surface and/or the like.

Conventionally, if a joiner wishes to plane an edge of a door, the joiner has to balance the door on a suitable surface, support the door with one hand and plane an edge of the door using their other hand. Alternatively, a user has to find a suitable jig to support the door in a required position to allow the user to plane and/or work on the door. Such jigs are generally large and are not easily transportable. Furthermore, the clamping means provided on the jig typically has to be actuated manually, thereby making it difficult for a single person to locate the door in a suitable position and clamp the door in said position simultaneously.

It is therefore an aim of the present invention to provide support means which overcomes the abovementioned problems.

It is a further aim of the present invention to provide a method of using support means.

According to a first aspect of the present invention there is provided support means for supporting one or more items in use, said support means including at least first and second members, at least one of said first and second members movable relative to the other member to allow clamping and/or unclamping on an item located between said members, and wherein said first and second members are hingedly or pivotably movable between said clamped and/or unclamped positions.

The first and second members are preferably joined together via a hinge or pivot arrangement at ends thereof, and further preferably opposing ends thereof.

Preferably each of said first and second members has a support surface or support element provided or formed thereon and a recess or space is defined between the support surfaces or support elements of said first and second members in at least the unclamped position. The one or more items which are to be supported are locatable in said recess or space in use to allow said items to be clamped.

Thus, in one embodiment at least a part of the one or more items being clamped is located substantially perpendicularly to the longitudinal axis of the support means.

Preferably the hinge or pivot arrangement is associated with the recess between said support surfaces or support elements of said first and second members. For example, the hinge or pivot arrangement can form a surface defining a part of said recess.

Preferably the hinge or pivot arrangement is such that the weight of an item located between said recess and/or on said hinge or pivot arrangement causes at least a part of said first and/or second members to move towards each other, relative to the other and/or towards the other member to a clamped position. Removal of the weight of the item away from said recess and/or said hinge or pivot arrangement causes said first and/or second members to move to an unclamped position, and typically for at least a part of the first and/or second members to move away from each other or from the other member. Thus, in one example it can be seen that the weight of an item due to gravity acting directly or indirectly on the hinge or pivot arrangement allows movement of at least part of the support means between unclamped and clamped positions and no additional user actuation means are required, thereby allowing hands free use of the support means.

Each of said first and second members typically includes a base, side walls and/or end walls and a top. In one embodiment the hinge or pivot arrangement is located at or adjacent the base of said first and/or second members. The top or opposing edges of said tops can move towards each other when the weight of an item is located in said recess and/or on said hinge or pivot arrangement.

Preferably the members are located end to end to form an elongate support means with the longitudinal axis of the members preferably being substantially co-axial. The recess is defined between the ends of the members.

Preferably a base of the first and/or second member is provided substantially horizontally or substantially parallel to a surface on which the support means is placed in the unclamped position, said base of said first and/or second member movable to an acute angle to the horizontal in the clamped position. The base can be in direct engagement with a surface on which the items are to be supported or indirectly via one or more support feet.

Preferably the hinge element or pivot point of said arrangement is provided substantially centrally in the recess or space between said support surfaces of said members.

Preferably one or more support feet are provided on or adjacent the base of said first and/or second members and said support feet allow the support means to be supported even when in the clamped position (i.e. and even when a part of the support means is at an acute angle to the horizontal).

Preferably the one or more support feet are located at or adjacent a free end of said first and/or said members.

Thus, for example, the first and second members each have a first end which is pivotably or hingedly mounted to the first end of the other member. The opposing free ends of said first and/or second members can be moved from a lowered position to a raised position when in the clamped position and said support feet help to maintain contact with the floor surface on which the support means is being used.

In one embodiment one or more support feet are movable between a substantially or partially folded condition, typically but not necessarily exclusively when the support means is not in use, and a substantially erect condition, when the support means are in use.

Preferably the one or more support feet are resiliently biased to the erect condition. The biasing means can include one or more springs, sprung metal, elasticated means and/or the like.

In one embodiment the weight of the member to which the one or more support feet are attached maintain the support feet in a folded condition until sufficient weight is applied to the support means in the recess or on the pivot/hinge arrangement to allow the portion of the members adjacent the feet to be raised with respect to the surface on which they are placed, thereby allowing the feet to be moved to an erect condition.

Preferably the one or more support feet are hingedly or pivotably movable between said erect and folded conditions.

The one or more support feet can include one or more discs, protruding members and/or the like.

One or more of the support feet can protrude outwardly of the first and/or second members to provide sufficient support to the support means and to prevent the means from toppling over in use. For example, the support feet can protrude from one or both sides of the first and/or second members, and further preferably in a direction substantially transversally thereof to increase the surface area at the free ends of the members in contact with the support on which the support means is placed in use.

One or more of the support feet can be adjustable to allow the height of the base of the first and/or second members to be adjusted relative to a surface on which the support means is to be located in use. The adjustment can include one or more screws, rotatable members and/or the like.

Preferably the one or more items are in the form of a door and the support means allows the door to be clamped in a suitable position so that a user can plane and/or work on the door. Any number of support means can be used to support one or more items as required. Each of a plurality of support means are typically located a spaced distance apart with respect to the item being supported.

In a further example, two support means are located a spaced distance apart and an upright member is clamped in each. A further member can be located on top of and between the upright members to form a work surface.

The hinge or pivot arrangement and thus the first and second members can be movable from an extended position, wherein the bases of the members are substantially co-planar and a spaced distance apart from each other (for example the bases can be arranged at approximately 180 degrees to each other), to a substantially folded or storage position, wherein the bases of the members can be moved towards each other such that they are substantially parallel and adjacent to each other. In the storage position, the support means is relatively compact and can be easily transported and stored. Engagement means can be provided to allow the support means to be maintained in the extended position and/or storage position as required.

Movement of the first and second members from the extended position to a folded or storage position is typically in an opposite direction to movement of the first and second members from the extended position to a clamped position. Thus, the pivot and/or hinge arrangement can be capable of moving through 0-360 degrees in one embodiment.

The opposing support surfaces of said first and second members are typically moved towards each other on movement from an unclamped position to a clamped position and are moved away from each other on movement from an unclamped or extended position to a folded/storage condition.

It is to be noted that an item can be suitably supported using the support means when the members are in an extended and unclamped position since the opposing upper edges of the members do not have to necessarily move towards each other in other to sufficiently clamp or engage the item.

In one embodiment the first and second members and/or opposing support surfaces of said first and second members are biased away from each other to the unclamped position, such as via resilient biasing means. As such, biasing means can be provided to bias the pivot or hinge arrangement to an unclamped position. This allows the support means to move towards an unclamped position once the weight of the item has been removed from the support means without a user having to manually actuate release of a clamping mechanism.

One or more inserts can be attached, and preferably detachably attached to one or more of the support surfaces to allow the size of the recess to be adjusted. This also allows the clamping force to be adjusted and allows the support means to be universal for use with any size and/or shaped item or items. The one or more inserts can be formed from any suitable material and, in one embodiment, is formed from a substantially resilient material, such as rubber, foam and/or the like.

Preferably the engaging surface of the one or more inserts and/or support surfaces which engages a surface of the item to be supported in use is provided with gripping means thereon to allow an item to be gripped between the first and second members. The gripping means can include one or more dimples, protrusions and/or the like provided on the surface as required.

In one embodiment the inserts can be tapered in form to provide an angled surface in the recess, thereby allowing increased gripping force to be applied at the base and/or top of the recess.

The first and second members can be any suitable shape, design and/or size and can be formed from any suitable material. The height and/or size of the support surfaces of said first and second members are such so as to provide sufficient support for an item located against said support surface in use. In one embodiment the first and/or second members are substantially elongate in form and can be the same and/or different lengths as required.

The hinge or pivot arrangement can be attached to the first and second members via any suitable attachment means. The attachment means can include any or any combination of one or more screws, nuts and bolts, rivets, welding, adhesive, clips, inter-engaging members and/or the like. The hinge or pivot arrangement can be detachable with the first and/or second members if required. For example, a pin through the hinge arrangement can be detachably attached to allow the hinge to be separated if required for storage and/or transportation purposes.

In one embodiment adjustment means are provided to allow adjustment of the spacing between the first and second members and/or between the support surfaces of said first and second members to allow the size of the recess or space in which the item is to be supported in to be adjusted as required. For example, the adjustment means may include a sliding mechanism, an eccentric cam and/or the like. Thus, in one example, the first and/or second members are capable of undergoing relative slidable motion. The adjustment means is typically located adjacent a base of the first and/or second members.

Preferably the adjustment means includes one or more slots defined in the hinge or pivot arrangement. Protrusion means associated with the first and/or second member is slidably mounted in said slot and can be secured at a required position in said slot, thereby securing the hinge or pivot arrangement in a required position with respect of the protrusion means and thus determining the dimensions of said recess.

In one embodiment height adjustment means can be provided on the first and/or second members. The height adjustment means can allow the first and/or second members to rise or lower in use. The height adjustment means can bias the members to a raised position prior to an item being located with the support means and can allow gradual lowering of the members when the weight of an item of located with said members.

Preferably movement means can be associated with the first and/or second members to allow movement of the support means across a surface in either the clamped and/or unclamped position. The movement means can include one or more wheels, rollers, ball bearings and/or the like.

In one embodiment connection means can be provided to allow two or more support means to be connected together. The connection means can include a rod, elongate member and/or the like for example. The connection means can be detachably attached to the support means.

According to a second aspect of the present invention there is provided a method of using support means for supporting one or more items in use, said support means including at least first and second members and said method including locating an item to be clamped between a recess or space defined between said support members in an unclamped position, said first and second members arranged so that at least one of said first and second members is movable relative to the other member to allow clamping and/or unclamping of an item located between said members, and wherein said first and second members are hingedly or pivotably movable between said clamped and/or unclamped positions.

According to a further aspect of the present invention there is provided a door support means.

According to a yet further aspect of the present invention there is provided support means for supporting one or more items in use, said support means including at least first and second members with one or more support surfaces provided thereon, a recess or spaced defined between the support surfaces in an unclamped position, at least one of said first and second members movable relative to the other member to allow clamping and/or unclamping on an item located between said members, and wherein said first and second members are hingedly or pivotably movable between said clamped and/or unclamped positions.

Thus, the present invention provides support means which can be movable between storage and erect conditions and/or, in the erect condition, can be moved between clamped and unclamped positions. The support means can be moved between the clamped and unclamped positions without the user having to manually actuate the support means since the clamping mechanism is typically activated as a result of the weight of the item being supported and unclamping takes place on removal of the weight of the item from the support means. As such, heavy items can be easily located with the support means without a user having to free their hands to manipulate the support means.

Embodiments of the present invention will now be described with reference to the accompanying figures, wherein.

Figure 3A:
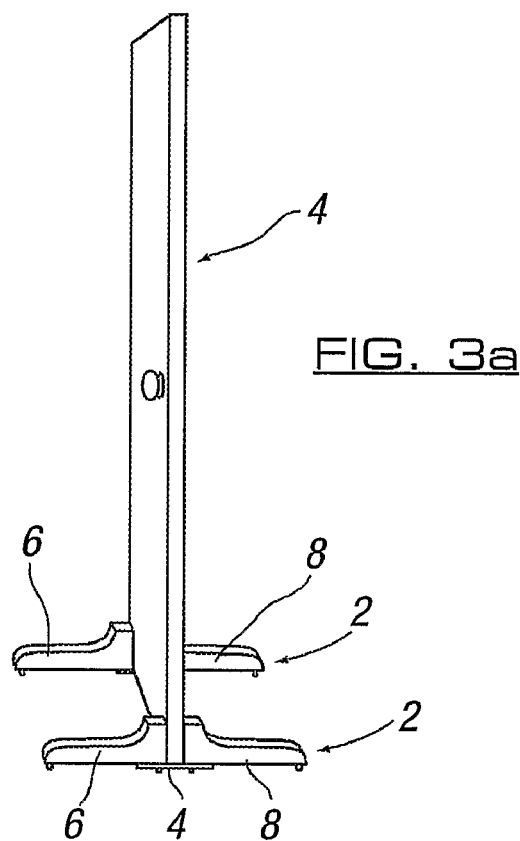
FIGS. 3a and 3b illustrate use of a plurality of support means for supporting a door in an upright position and on its side respectively.
Figure 3B:
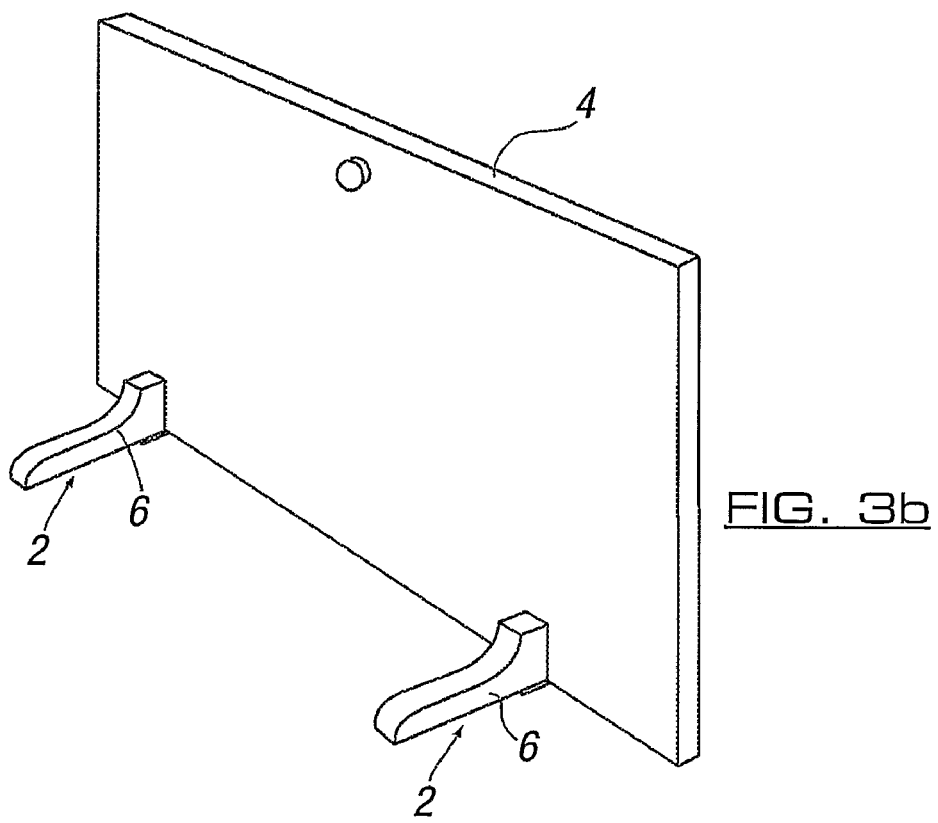

Referring to the figures, there is illustrated support means in the form of door support devices 2 for supporting a door 4 in use in either an upright position, as shown in FIG. 3a, or a side position, as shown in FIG. 3b. With the door supported in the manner shown, a user can easily plane and/or work on the door.

Each support device 2 includes a first member 6 and a second member 8. Each member 6, 8 is joined together adjacent opposing ends 10, 12 via a hinge 14. More particularly, hinge 14 includes a first plate portion 16 joined to base 18 of member 6 via suitable attachment means and a second plate portion 20 joined to base 22 of member 8 via suitable attachment means in the form of screws 23. A hinge or pivot element 24 is provided centrally between plate portion 16 and 20. The attachment means can include any or any combination of welding, adhesive, one or more screws, nuts and bolts, clips, ties, inter-engaging members and/or the like.

Opposing end surface 26, 28 of each member 6, 8 are provided a spaced distance apart to form a recess 30 therebetween. Recess 30 is of such dimensions so as to allow a door to be located between the same. With a door located in recess 30, at least a part of end surfaces 26, 28 engage against the outer surfaces of the door to support the door.

Figure 1:
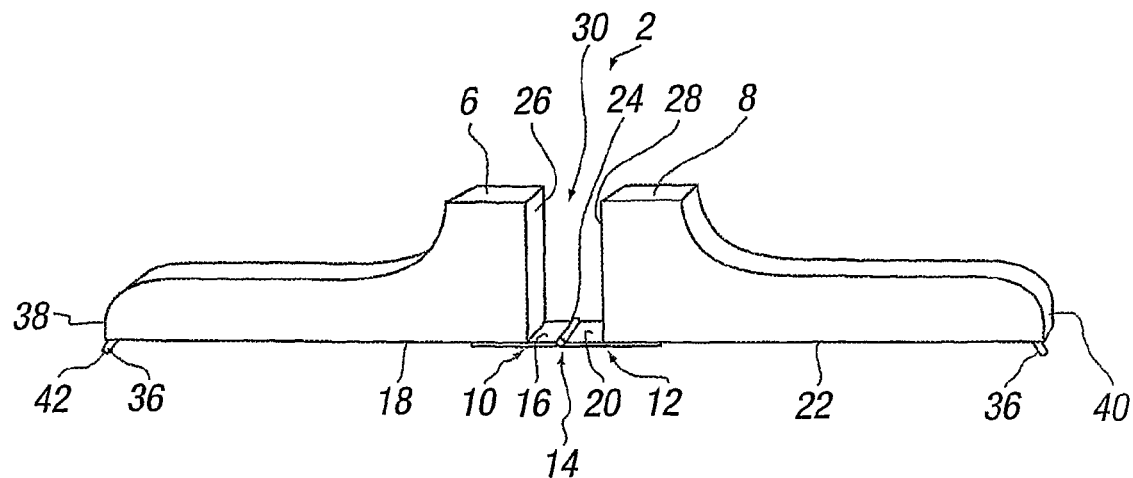
FIG. 1 is a perspective view of support means according to an embodiment of the present invention in an in-use position.
Figure 2:
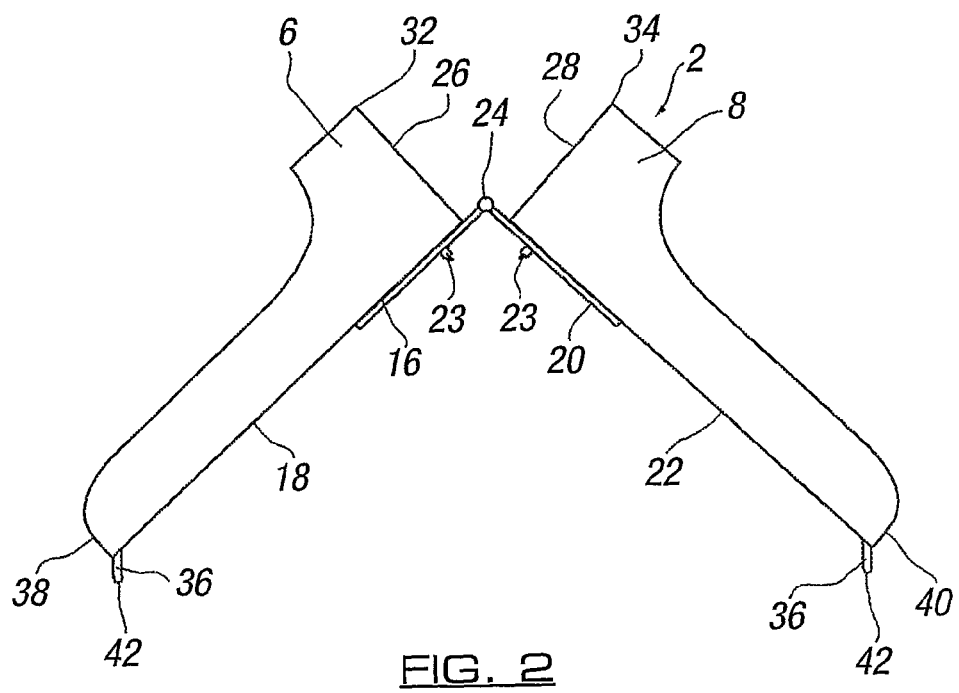
FIG. 2 is a front view of support means in a partially folded or storage position.

Each plate portion 16, 20 of hinge 14 is capable of movement in a clockwise or anti-clockwise direction and typically through approximately 0-360 degrees. As such, end surfaces 26, 28 of members 6, 8 can also be moved towards each other or away from each other. More particularly, each member can be moved about hinge 14 between a storage or folded condition (as partially shown in FIG. 2), and an erect condition (as shown in FIG. 1). In the storage condition, bases 18, 22 of members 6, 8 are adjacent and substantially parallel to each other, thereby providing a compact and easily transportable device. In the erect condition, bases 18, 22 are substantially co-planar when the device is not being used to clamp an item and opposing end surfaces 26, 28 are a spaced distance apart and substantially parallel to each other.

Figure 4:
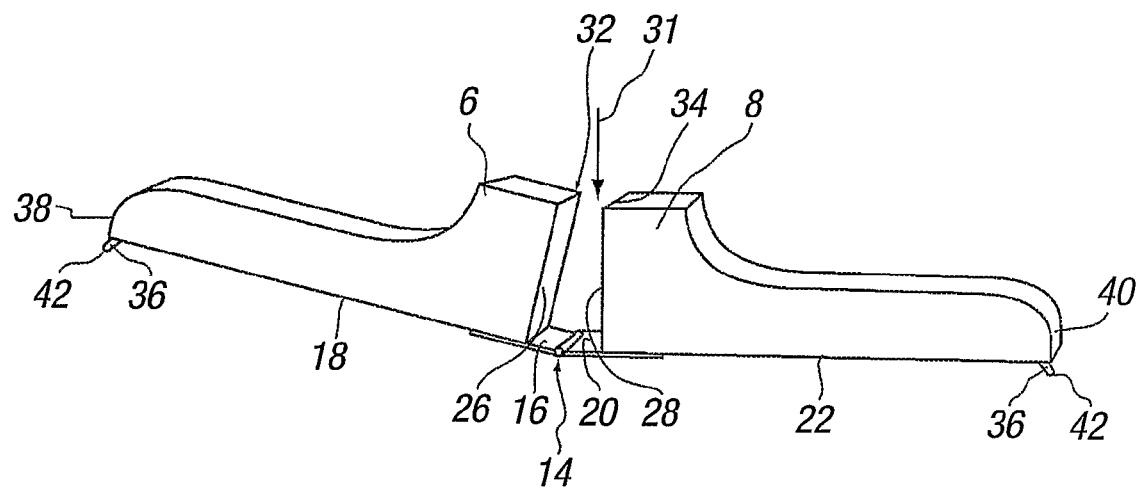
FIG. 4 illustrates movement of the support means towards a clamped position when weight in the form of an item to be supported is placed on the support means in one embodiment.

With the support means in the erect condition, an edge of a door can be located in recess 30 and, once the weight of a door (as shown by arrow 31 in FIG. 4) is placed on hinge 24, this causes hinge 24 to depress towards the surface on which the support means are located. At the same time, top edges 32, 34 of members 6, 8 moves towards each other and engage against a surface of the door, thereby clamping the door in position. If a user lifts the door from the support means, weight 31 is removed from hinge 24, thereby causing members 6, 8 to pivot from the clamped position to the extended, unclamped position.

Biasing means can be associated with hinge 14 to allow the support means to return automatically to the unclamped position or extended position as soon as an item is disengaged from hinge 14.

Support feet 36 are provided on bases 18, 22 adjacent the free ends 38, 40 thereof. The support feet are typically pivotably mounted by suitable pivot or hinge means and can be moved between erect and at least partially folded conditions. The support feet 36 raise members 6, 8 a spaced distance above a floor surface on which the support means is placed in use, thereby allowing the base portions of members 6, 8 adjacent ends 10, 12 thereof to move towards the ground surface on depression of hinge 24 on clamping of an item in the support means. As the top edges 32, 34 of ends 26, 28 move towards each other on clamping of an item, free ends 42 of feet 36 move outwardly of the members towards free ends 38, 40 to an erect condition, thereby maintaining contact of the feet with the ground surface as free ends 38, 40 of the members are moved to a raised position. With the feet 36 in a folded condition, free ends 42 can be folded such that they face away from free ends 38, 40. The support means can be resiliently biased to the erect condition. In an alternative embodiment, the support feet are fixed to the base of the members.

Figure 5:
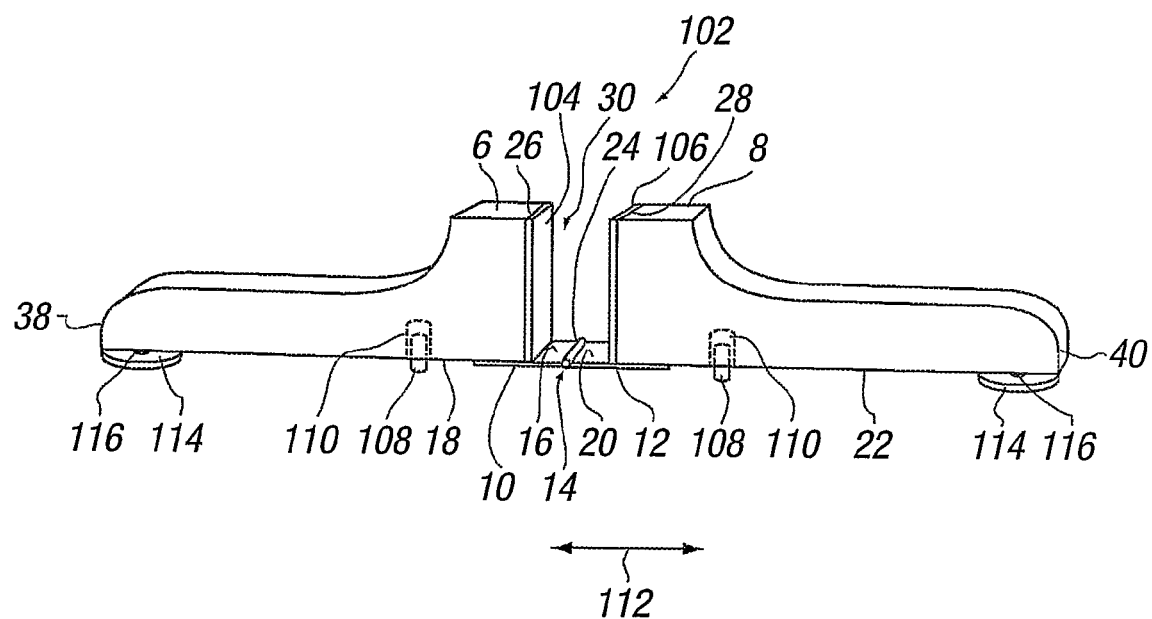
FIG. 5 illustrates support means according to an alternative embodiment of the present invention.

With reference to FIG. 5, a further example of support means 102 is illustrated. Detachable inserts 104, 106 are locatable adjacent support end surfaces 26, 28 to allow the size of recess 30 to be adjusted to fit different sized doors and/or to allow adjustment of the clamping force applied to a door.

Biasing means in the form of hydraulic pistons 108 are provided on the base 18, 22 of members 6, 8. The pistons 108 are bias to an extended position when the support means 102 is in an erect position and not being used to support one or more items, such that they protrude from piston cavity 110 in which they are slidably located. In this position, the base 18, 22 of members 6, 8 are in a raised position with respect to a floor surface. On location of an item in recess 30, the weight of the item causes members 6, 8 to be lowered and pistons 108 to move to a recessed position within piston cavity 110. The hydraulic pistons allow movement between the raised and lowered positions to be relatively smooth and gradual. On removal of the weight of the item from recess 30, the pistons 108 return to an extended position.

Adjustment means can be provided on base 18 and/or 22 to allow member 8 to be moved relative to member 6 and/or vice versa in a substantially longitudinal direction, as shown by arrow 112. This allows the size and/or width of recess 30 to be adjusted to allow the clamping pressure to be adjusted and to allow the device 102 to fit different sized items.

Support feet in the form of rotatable discs 114 are attached to the base 18, 22 of members 6, 8 at the free ends 38, 40 thereof. Rotation of discs 114 about attachment screw 116 allow the height of disc 114 relative to base 18, 22 to be adjusted. As such, with discs 114 in contact with a surface on which the device is placed, members 6, 8 can be raised and lowered as required with respect to the surface. The discs 114 typically provide a larger surface area than free ends 38, 40 to engage with the floor surface to prevent the device 102 from being knocked over in use. Discs 114 protrude either side of members 6, 8.

Members 6, 8 are substantially elongate in form and extend substantially perpendicularly either side of a surface of an item being engaged in recess 30. They can be any suitable shape, size and/or design as required.

Figure 6A:
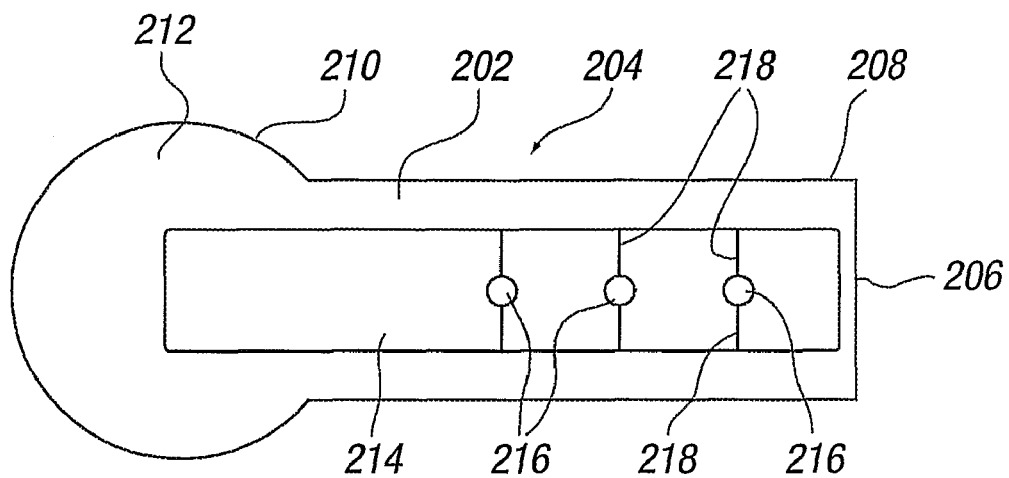
FIGS. 6a-6c illustrate an example of an adjustment mechanism according to a further embodiment of the present invention.
Figure 6B:
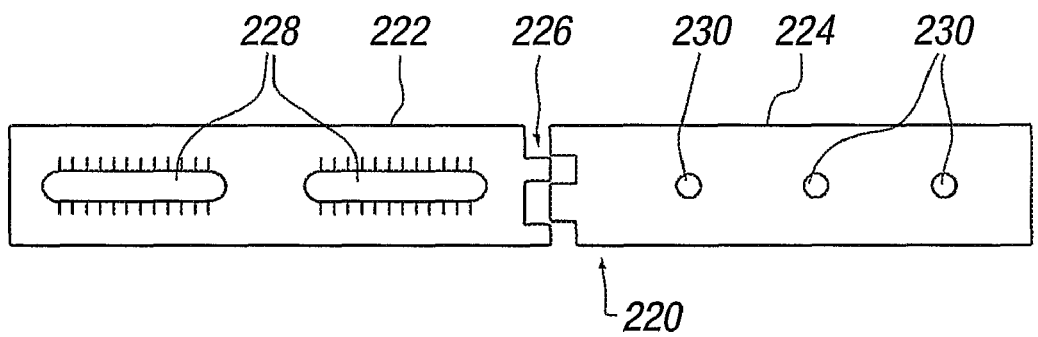
Figure 6C:
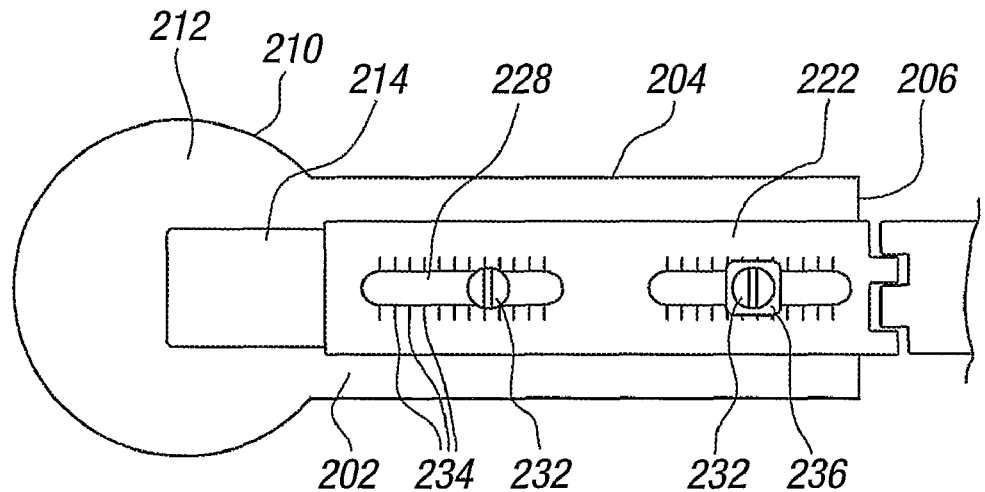

Referring to FIGS. 6a-6c, there is illustrated an adjustment mechanism. The base 202 of a first support member 204 is shown for the purposes of clarity in FIG. 6a. The base 202 includes a support surface 206 located at an end 208 for location adjacent a second support member (not shown). The opposite free end 210 is provided with a support foot in the shape of a partial disc 212. A recess 214 is defined in base 202 and includes a plurality of channel members 216 supported by strengthening ribs 218 in said recess. The longitudinal axis of the channel members are typically provided substantially perpendicular to the longitudinal axis of the member 204.

An example of a hinge arrangement 220 is shown in FIG. 6b. Hinge arrangement 220 includes a first hinge element 222 and a second hinge element 224 with a hinge connection 226 joining the two elements together. First hinge element 222 includes elongate slots 228 defined substantially parallel to the longitudinal axis of said element. Second hinge element 224 includes a plurality of attachment apertures 230 located at spaced apart intervals for attachment via a bolt located through the apertures 230 to the base of the second support member.

Referring to FIG. 6c, hinge element 222 is located over recess 214 and bolts 232 are located through channels 216 and slots 228 and secured with a nut, thereby securing the hinge element at a suitable position on base 202 and defining the spacing between support surface 206 and the support surface of the second support member.

A plurality of rib members 234 can be provided substantially perpendicular to the slots 228 and on either side thereof. These rib members allows a connection piece 236 to be located into engagement with rib members 234, and bolt 232 is located through an aperture on connection piece 236. This reduces the likelihood of the bolt slipping in the slot when engaged. The bolts can be releasably engaged with the slots, thereby allowing the hinge element 222 to be slidable to a different position relative to the bolts.

Any or any combination of the abovementioned features can be provided with the present invention as required.

The invention claimed is:

1. A support for supporting one or more items in use, said support comprising:
   at least first and second members, each having a support surface or element configured such that a space is defined between the support surfaces or elements, and
   an adjustment means is configured to allow adjustment of the space between the support surfaces or elements;
   where first ends of said first and second members are joined together via a hinge arrangement to allow said first and second members to be pivoted relative to each other to allow clamping and unclamping on an item located between said members;
   where the hinge arrangement is disposed at first ends of the first and second support members, and includes a first hinge element joined to a base of the first support member and a second hinge element joined to a base of the second support member, with a hinge connection joining the two hinge elements together;
   where the adjustment means includes a plurality of slots defined in the first hinge element;
   where one or more support feet are coupled to the bases of the first and second support members spaced apart from the first ends of the first and second support members, the support feet configured to contact a floor surface on which the support means is used, and
   where protrusions associated with the first support member are slidably mounted in said slots and are configured to be secured at a position corresponding to a desired spacing between the support surfaces or elements and to secure the first hinge element at a suitable position on the base of the first support member.

2. The support according to claim 1 wherein the hinge arrangement is formed such that the weight of an item to be supported when located in said space or recess or into engagement with said hinge arrangement causes at least a part of said first or second member to move relative to and towards the other member to provide a clamped position, and wherein the hinge arrangement is formed such that removal of the weight of an item being supported in said space or recess or in engagement with said hinge arrangement causes at least a part of said first or second member to move relative to and apart from the other member to provide an unclamped position.

3. The support according to claim 1 wherein the base of the first or second member is provided substantially horizontally or parallel to a surface on which the support is placed in the unclamped position, the base of said first or second members movable to an acute angle to the horizontal in the clamped position.

4. The support according to claim 1 wherein a hinge connection of said hinge arrangement is provided substantially centrally in the recess or space between said support surfaces of said members.

5. The support according to claim 1 wherein the first and second members are movable from an extended position, wherein the bases of the members are a spaced distance apart from each other, to a substantially folded position, wherein the bases of the members are substantially parallel and adjacent to each other.

6. The support according to claim 1 wherein the first and second members are biased to an unclamped position.

7. The support according to claim 1 wherein a resilient biasing member is associated with the hinge arrangement.

8. The support according to claim 1 wherein one or more inserts are attachable to the support surfaces of said first and second members.

9. The support according to claim 1 wherein each of said first and second members comprise a support surface and wherein the support surfaces of said first and second members are provided with gripping members thereon.

10. The support according to claim 1 wherein the inserts are tapered to provide the recess between the first and second members with an angled surface.

11. The support according to claim 1 wherein a movement member is associated with the first or second member to allow movement of the support across a surface in use.

12. The support according to claim 11 wherein the movement member comprises one or more wheels, rollers or ball bearings.

13. The support according to claim 1 wherein a connection member is provided to allow the support to be connected a second support.

14. The support according to claim 13 wherein the connection member comprises a rod or elongate member.

15. A method of using a support for supporting one or more items, said support comprising: at least first and second members each having a support surface or element configured such that a recess or space is defined between the support surfaces or elements, first ends of said first and second members joined together via a hinge arrangement to allow said first and second members to be pivoted relative to each other for clamping and unclamping of an item between the members, and adjustment means configured to allow adjustment of the space between the support surfaces or elements, the method comprising:

disposing an item in the space between said support members when the support members are in an unclamped position;

where the hinge arrangement is disposed at first ends of the first and second support members, and includes a first hinge element joined to a base of the first support member and a second hinge element joined to a base of the second support member, with a hinge connection joining the two hinge elements together;

where the adjustment means includes a plurality of slots defined in the first hinge element;

where one or more support feet are coupled to the bases of the first and second support members spaces apart from the first ends of the first and second support members, the support feet configured to contact a floor surface on which the support means is used;

where protrusions associated with the first support member are slidably mounted in said slots, and are configured to be secured at a position corresponding to a desired spacing between the support surfaces or elements and to secure the first hinge element at a suitable position on the base of the first support member.

\* \* \* \* \*